Sept. 24, 1946.    H. G. BUSIGNIES    2,408,039
ELECTRONIC ROTATION DIRECTION FINDER
Filed March 5, 1941    2 Sheets-Sheet 2

INVENTOR.
HENRI C. BUSIGNIES
BY
ATTORNEY

Patented Sept. 24, 1946

2,408,039

UNITED STATES PATENT OFFICE 2,408,039

ELECTRONIC ROTATION DIRECTION FINDER

Henri G. Busignies, Forest Hills, N. Y., assignor to International Standard Electric Corporation, New York, N. Y., a corporation of Delaware Application March 5, 1941, Serial No. 381,840

3 Claims. (Cl. 250—11)

This invention relates to direction finder systems and more particularly to direction finder systems having rotary goniometer effects, and cathode ray indicators used with such systems.

In direction finder systems it is known to produce a rotary effect of the antenna system by using fixed antennas such as crossed loops with a rotating coil or goniometer coupled to the loops to produce a desired rotary effect. This, however, necessitates the use of a motor for operating the rotating parts.

It is an object of my invention to provide electronic means for producing the desired rotary effect of the antenna without the use of mechanical rotating parts.

Furthermore, in systems wherein rotary goniometers are used with a cathode ray indicator it is necessary to provide some means for assuring that the rotation of the cathode ray is rotated in proper timed relation with the goniometer rotation.

It is a further object of my invention to provide a means operated in timed relation with the signals producing the effective rotation of the antenna to simultaneously rotate the beam of a cathode ray tube.

The above recited objects may be achieved according to my invention by providing a phase splitting network and vacuum tube arrangement coupled to a pair of crossed antennas to produce an effective rotation. The energy derived from this phase splitter is applied to the deflecting plates of a cathode ray indicator, with frequency multiplication if desired, to produce the desired timed rotation of the cathode beam. The resultant signal from the loops is applied to the cathode ray tube to produce signal indications, preferably by achieving radial deflection through velocity modulation. Alternatively the signal may be applied to a signal grid in the cathode ray tube and lateral deflections may be produced in proper timed relation by a relaxation oscillator.

In accordance with the above features of my invention it is a further object of my invention to provide a cathode ray indicator in which a directive signal is produced on the screen by an arrangement including means for laterally deflecting the beam by velocity modulation.

When the beam is caused to deflect radially from any position, either the center or outward, by received signals, it is desirable that the beam be suppressed during the times that the signal indications are not effective. Accordingly, it is a further object of my invention to provide means controlled by signal voltages for rendering the beam effective or ineffective.

A better understanding of my invention and the objects and features thereof may be had from the particular description of some modifications of my invention made with reference to the accompanying drawings, in which Fig. 1 shows a general schematic view of a direction finder according to my invention;

Figure 1:
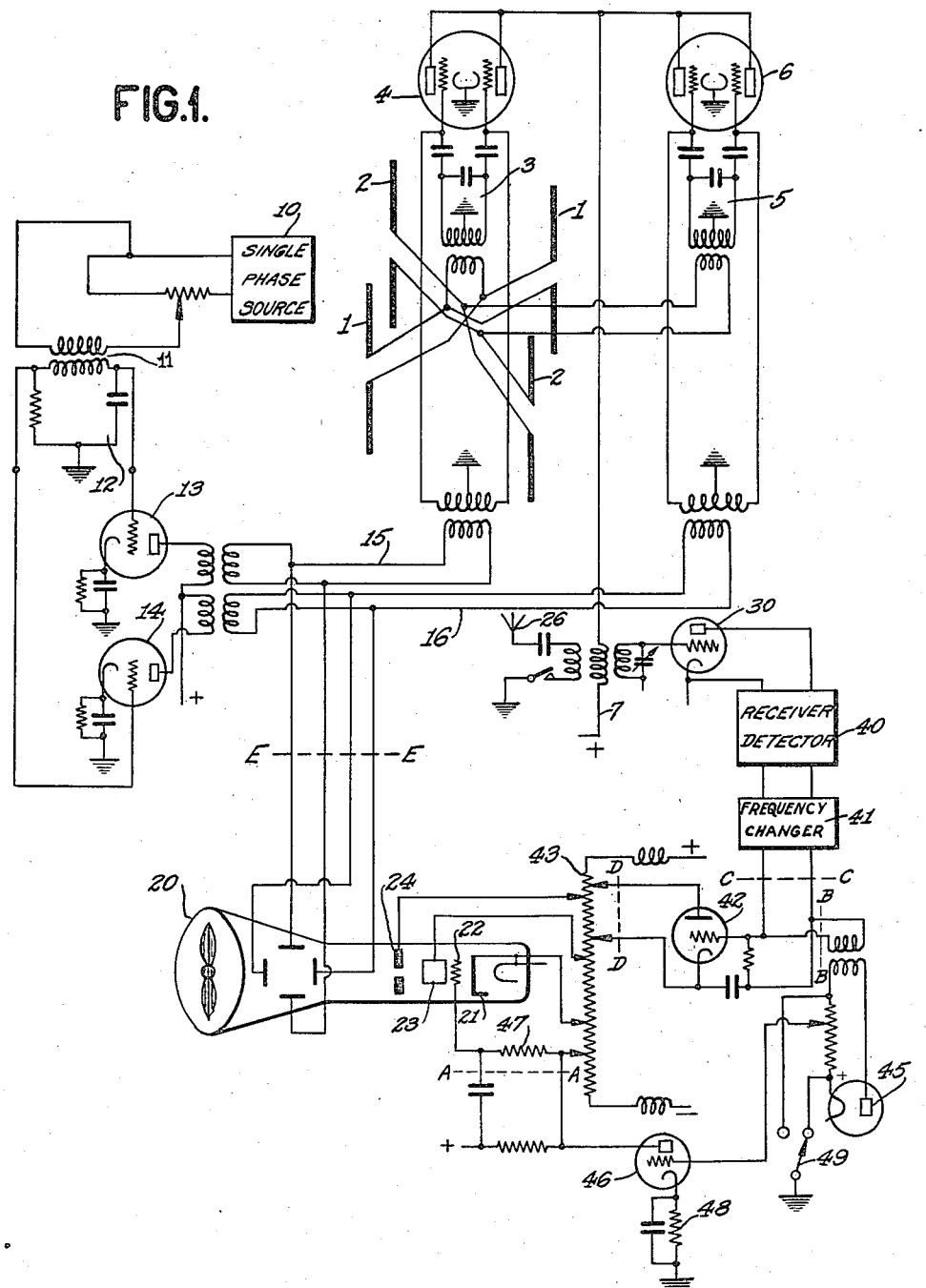

In Fig. 1 is shown an antenna system comprising a pair of dipoles 1, 1 and a second pair of dipoles 2, 2 connected together to act as crossed directional receiving units. To antenna 1 is coupled a circuit 3, the opposite sides of which are applied to push-pull related grids in a tube 4, and with antenna system 2 is coupled a circuit 5 coupled in push-pull relation to grids of a tube 6. The anodes of both the double tubes 4 and 6 are connected in parallel to a common feed line 7. An alternating current source 10 is provided connected over a transformer 11 to an adjustable phase splitting circuit 12, the separate phases of which are coupled if desired through amplifiers 13, 14, to individual circuits 15, 16. Circuit 15 is coupled to the grids of tube 4, the coupling circuit being grounded at its mid-point so that energy at 180° phase difference is applied to the grids of tube 4. Circuit 16 in which the energy is in phase quadrature to that of circuit 15, is similarly coupled to the grids of tube 6. It should be understood that instead of the combined tubes 4 and 6 shown, separate vacuum tubes could be used in this arrangement.

It will be noted that energy is supplied to the grids of tubes 4 and 6 from the circuits 15, 16 in such a manner that the output energy in line 7 will be of a wave formation exactly the same as if a rotatable goniometer were provided. Accordingly, by the use of this arrangement an effective rotation of the directional antennas is achieved without the necessity of providing mechanically rotating parts.

In order to obtain a directional indication, a cathode ray tube 20 is provided. The deflecting electrodes of tube 20 are connected to circuits 15, 16, respectively, to provide a deflecting potential which will serve to rotate the cathode ray beam in synchronism with the electronic rotation of the loop. As shown in this figure the output energy from the antenna is coupled over a vacuum tube 30 to a receiving detector arrangement 40 to a coupling arrangement 41. Arrangement 41 may, for instance, be a re-modulating system in which the signals are re-modulated onto a fixed intermediate frequency so that the direction finder is universally useful with all types of signals over a wide frequency range. The output of 41 is coupled through a detector tube 42 to spaced points on a resistance element 43, which serves to provide the operating potentials for the electrodes of cathode ray tube 20.

Cathode ray tube 20 is provided with an electron emitting cathode 21, a control grid 22, a focusing element 23, and an accelerating electrode 24. It will be noted that as connected, the output of tube 42 will vary the potential on accelerating electrode 24. This variation in voltage will velocity modulate the electron beam and will thus cause a radial displacement of the beam of the cathode ray tube. It can, therefore, be readily seen that the rotated electron beam will be deflected radially either inwardly or outwardly under control of the envelope potentials. Thus, a pattern will be produced on the screen of cathode ray tube 20 indicating the direction of reception of signals. If desired a sensing antenna 26 may be provided to avoid the ambiguity of indication.

It will be seen that if no further circuits are provided, the cathode ray beam will continuously trace a circle on the face of cathode ray tube 20, even if the receiving circuit is arranged so that only peak potential is applied to the electrode 24. If it is desired to avoid this continuous trace, a system may be arranged to maintain grid 22 biased substantially to cut-off, except at periods during which an indicating portion of the signal envelope is being received. In Fig. 1 this is provided by means of a rectifier tube 45 coupled to the output of 41, which rectifier supplies energy over amplifier 46 to a resistance unit 47 in the normal biasing circuit of grid 22. Tube 46 is provided with a self-biasing resistance condenser circuit 48. A switch 49 is provided so that the energy from rectifier 45 may be applied either to increase or decrease the negative potential on grid 22. By this arrangement the cathode ray tube may be arranged to be either bright during the signal reception, and dark the remainder of the time, or dark during signal reception and bright the remaining portion of the time. The self-biasing circuit 48 serves to maintain the proper bias on amplifier tube 46, to maintain the proper relation between voltages from rectifier 45 regardless of the position of switch 49.

Figure 2:
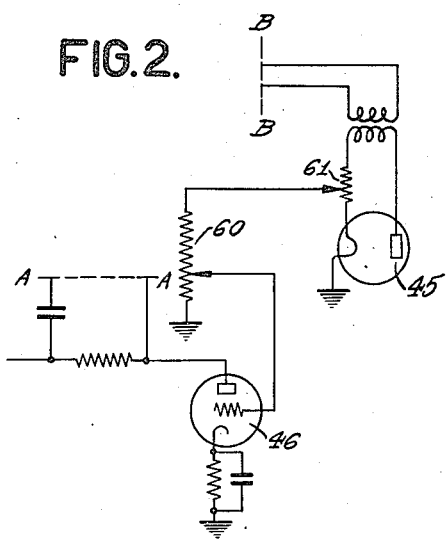
Figs. 2 and 3 show alternate grid control means for the indicator tube.

In Fig. 2 is provided an alternative black-out arrangement for the beam of cathode ray tube 20, the circuit shown being capable of substitution for that part of the circuit of Fig. 1, shown between lines AA and BB. In this arrangement the energy from rectifier 45 is applied over a potentiometer resistance 60 to amplifier 46, so that the degree of brightness of the beam may be readily controlled. Also, the potentiometer 61 is provided to adjust the amount of rectifier voltage supplied across potentiometer 60. This circuit provides for ready adjustment of the potential applied to the grid 22 of tube 20.

Figure 3:
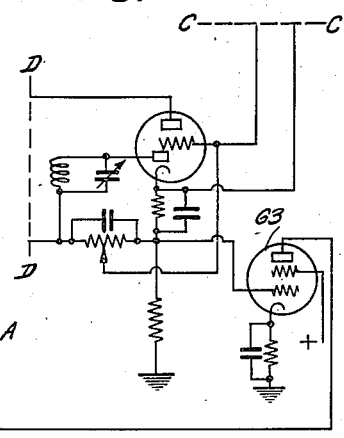

An alternative and preferred arrangement for the rectifier unit is shown in Fig. 3. In this arrangement the entire part of the circuit of Fig. 1, cut-off at lines AA, BB and CC, should be replaced by that shown in Fig. 3. In place of tube 42 is provided a tube of the 6Q7 type which replaces both amplifier 42 and rectifier 45. Tube 46 is replaced by a tetrode tube 63.

Figure 4:
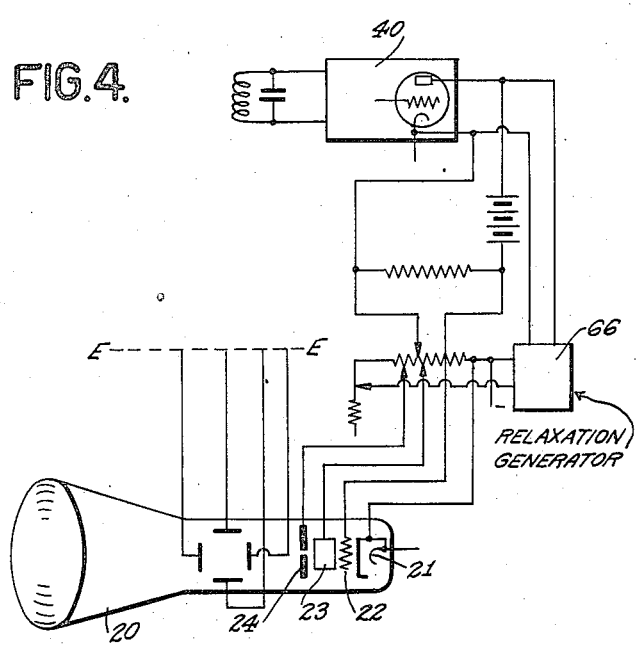
Fig. 4 shows an alternative indicator arrangement.
Figure 5:
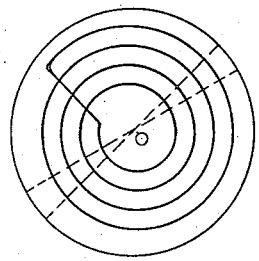
Figs. 5 and 6 show cathode ray screens used to explain the operation of the circuit of Fig. 4.
Figure 6:
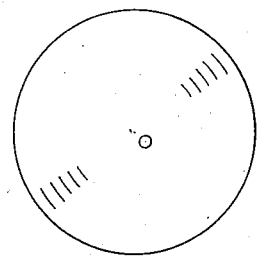

In place of the entire cathode ray assembly of Fig. 1, may be substituted the alternative arrangement of Fig. 4. In this arrangement the cathode ray tube 20 is similarly provided with an accelerating electrode 24, concentrating electrode 23, grid 22 and cathode 21. The output of receiver 40, however, is connected to the grid 22 of the cathode ray tube instead of to the accelerating electrode. The accelerating electrode is controlled by a relaxation oscillation generator 66. The period of relaxation oscillation generator 66 is made to be long relative to the rotation frequency of the cathode ray beam and the effective rotation of the antenna system. Accordingly, a spiral pattern such as shown in Fig. 5 will normally be traced. However, grid 22 of tube 20 is normally biased so that only at the indicating peak of the signal will an indication be visible on the screen of cathode ray 20. Accordingly, when the direction signal is applied to grid 22, a series of marks will appear on the screen producing a radial indication, as shown in Fig. 6. It can be readily seen that this type of indication depends upon the rotation of the electron beam and a simultaneous radial and emission control of the cathode ray beam.

Relaxation oscillator 66 may be arbitrarily controlled in frequency so long as the period of its oscillation is made equal to a plurality of rotations of the cathode ray beam. However, if desired, the generator may be controlled directly from receiver 40 or from one of the circuits 15 or 16, so as to produce oscillations which are a controlled sub-multiple of the rotation frequency of the cathode ray beam.

It is clear that many of the features disclosed above may be modified without departing from the scope of my invention. Furthermore, although there is a particular cooperation between the various elements comprising the complete direction finder, some of these elements may be useful in other circuits apart from the specific combinations recited. For example, the electronic rotation may be applied to circuits having other types of radial deflection. This is not preferred, however, since in such a case it is necessary to provide an additional electronic distributor or mechanical distributor for rotating the cathode ray beam in order that effective radial production of signals may be achieved.

It is also clear that the circuit arrangement of Fig. 5 may be utilized independently of the electronic rotation of the beam as can the indicator arrangement of Fig. 1. However, if other forms of rotation are used the advantageous cooperation of the deflection indicator of this type will be considerably lessened.

What is claimed is:

1. A direction finder comprising an aerial system means for producing an effective rotation of said aerial system to produce an indicating voltage dependent upon the effective angular position of said aerial system with respect to a source of radiation, a cathode ray tube indicator having an electrode system for producing a cathode ray beam, means for producing a rotation of said cathode ray beam in timed relation with effective rotation of said aerial system, means comprising a saw-tooth oscillation generator having a period equal to a predetermined number of rotations of said beam for causing a velocity modulation of said beam to produce a lateral deviation of said beam, and means comprising an electrode controlled by said indicating voltage for controlling the intensity of said beam for applying said indicating voltage to said cathode ray tube to obtain a direction indication.

2. A direction finder comprising an aerial system means for producing an effective rotation of said aerial system to produce an indicating voltage dependent upon the effective angular position of said aerial system with respect to a source of radiation, a cathode ray tube indicator having an electrode system for producing a cathode ray beam, means for producing a rotation of said cathode ray beam in timed relation with effective rotation of said aerial system, means comprising a saw-tooth oscillation generator having a period equal to a predetermined number of rotations of said beam, for causing a velocity modulation of said beam to produce a lateral deviation of said beam, and means for applying said indicating voltage to said cathode ray tube to obtain a direction indication.

3. A cathode ray tube indicator for use with an effectively rotatable aerial system having an electrode system for producing a cathode ray beam, means for producing a rotation of said cathode ray beam in timed relation with effective rotation of said aerial system, means comprising a saw-tooth oscillation generator having a period equal to a predetermined number of rotations of said beam for causing a velocity modulation of said beam to produce a lateral deviation of said beam, a source of indicating voltage, and means for applying indicating voltage from said source to said cathode ray tube to produce an indication.

HENRI G. BUSIGNIES.